United States Patent [19]

Pelkonen

[11] Patent Number: 5,349,697
[45] Date of Patent: Sep. 20, 1994

[54] RADIOTELEPHONE INCLUDING BATTERY-BACKUP RANDOM ACCESS MEMORY FOR STORING OPERATING CODE

[75] Inventor: Sakari Pelkonen, Oulu, Finland

[73] Assignee: Nokia Mobile Phones Ltd., Salo, Finland

[21] Appl. No.: 897,280

[22] Filed: Jun. 11, 1992

[30] Foreign Application Priority Data

Jun. 14, 1991 [FI] Finland .................................. 912875

[51] Int. Cl.⁵ ............................................. H04B 1/38
[52] U.S. Cl. .................................... 455/89; 455/127; 379/58; 371/21.5
[58] Field of Search ............. 455/89, 127, 186.1, 455/186.2, 343; 379/58; 365/229; 371/21.5, 12; 395/325, 575

[56] References Cited

U.S. PATENT DOCUMENTS

| | | | |
|---|---|---|---|
| 3,882,400 | 5/1975 | Hamada | 455/186.1 |
| 3,980,935 | 9/1976 | Worst | 365/229 |
| 4,119,915 | 10/1978 | Maddaloni | 455/186.1 |
| 4,525,865 | 6/1985 | Mears | 455/186.1 |
| 4,593,155 | 6/1986 | Hawkins | 455/89 |
| 4,606,076 | 8/1986 | Davis | 455/343 |
| 4,646,307 | 2/1987 | Nishimura | 371/21.5 |
| 4,698,808 | 10/1987 | Ishii | 371/21.5 |
| 4,710,971 | 12/1987 | Nozaki et al. | 455/179.1 |
| 4,771,399 | 9/1988 | Snowden et al. | 364/900 |
| 5,086,509 | 2/1992 | Inubushi et al. | 455/89 |

FOREIGN PATENT DOCUMENTS 0003200 1/1983 Japan .................................. 371/21.5

OTHER PUBLICATIONS

Finnish Office Action dated Feb. 21, 1992.

Primary Examiner—Edward F. Urban
Assistant Examiner—Andrew Faile
Attorney, Agent, or Firm—Perman & Green

[57] ABSTRACT

The program code of an object program of a radiotelephone is recorded into a RAM (3) rather than in an EPROM as is conventional. The checking of the program code and the loading of the program from an external device coupled thereto via an external bus is controlled by program recorded in a ROM (4). This allows the program code to be changed and updated as required with time consuming and expensive replacement of a whole memory.

5 Claims, 1 Drawing Sheet

RADIOTELEPHONE INCLUDING BATTERY-BACKUP RANDOM ACCESS MEMORY FOR STORING OPERATING CODE

FIELD OF THE INVENTION

The invention relates to the recording of the programme code of the object programme in a radiotelephone, e.g. a cellular radiotelephone.

BACKGROUND OF THE INVENTION

In radiotelephones, the programme code of the object programme i.e. the operating software has conventionally been recorded into a permanent storage non-volatile memory e.g. a read-only-memory (ROM) or an erasable programmable ROM (EPROM) i.e. a memory in which the contents are not lost when the power supply is switched off. Such a solution is used when the object programmes cannot be loaded from an external memory, such as a diskette or similar, when switching on the radiotelephone. The use of a permanent memory, such as a ROM, is a satisfactory solution per se, but it is expensive if the recorded programmes have to be updated. When updating the object programme, the radiotelephone must be opened in order to replace the memory. If the memory has been installed by soldering, this replacement will require the services of a professional installer. Optionally, the medium is installed on the base, involving raised costs and space requirement. However, the updating of the storage is an onerous operation and usually the radiotelephone has to be taken to service for this.

SUMMARY OF THE INVENTION

According to the present invention, there is provided a method for storing the programme object code in a radiotelephone comprising logic means, a non-volatile memory and a RAM coupled to the logic means and, wherein the programme code is recorded in the RAM. This has the advantage that because a RAM is used to store the programme code one is able to update the programme code without need to replace the memory thus eliminating the inconveniences described above, and the rationalization and time saving yielded by the invention are significant, as the number of radiotelephones increases very rapidly nowadays.

The programme code may be supplied via an external bus from an external device coupled to the radiotelephone under control of the non-volatile memory. This has the advantage that no professional installer is needed for loading the programme of the radiotelephone. The updating of the programme code can now be carried out by a service company as before, but also by a telephone shop for instance, which is equipped with a simple service device and a programme code updating version.

DESCRIPTION OF THE DRAWINGS

The invention is described, by way of example only, with reference to the accompanying drawing which is a schematic block diagram of the features of a radiotelephone implementing the invention.

DETAILED DESCRIPTION OF THE INVENTION

Figure 1:
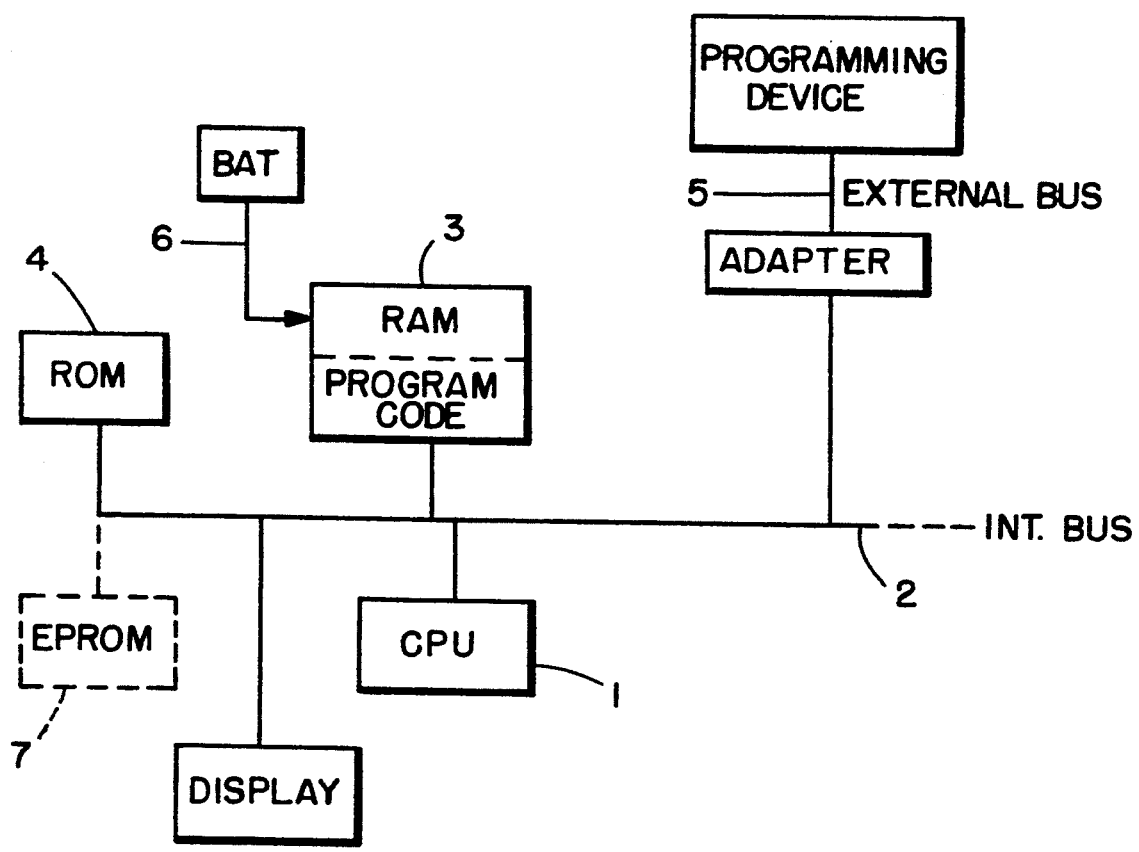

A radiotelephone comprises a central processing unit (CPU) 1 coupled to an integrated internal bus INT BUS 2. The CPU 1 can communicate, via the bus 2, with a random-access-memory (RAM) 3 of reading and writing type, a permanent, i.e. non-volatile memory, ROM 4, and, via an adapter, to an external bus EXT BUS 5. Conventionally, an EPROM 7—indicated by a dotted line in the figure—is used to store the programme code of the object programme. However, in the present invention, the programme code is stored in the RAM 3. The RAM 3 is preferably the RAM conventionally provided in radiotelephones for the storage of variable data therein. A current supply to the RAM 3 is ensured via a connection wire BAT 6, whereby a security battery supplies the RAM 3 with current when the current source of the radiotelephone is removed. The capacity of the RAM 3 is selected to be high enough to allow storage of the code of the programme for controlling the operation of the radiotelephone i.e. the object programme as well as of the operating data during operation.

The ROM 4 is of a small size and has a small programme stored therein for checking that the programme code in the RAM 3 is correct. In addition, a communication programme for communicating via the external bus 5 is programmed in the ROM 4.

The programme code is stored in the radiotelephone in the following way. When the radiotelephone is switched on, i.e. when the power is switched on, the checking programme recorded in the ROM 4 controls the CPU 1 to read and check the integrity of the programme code stored in the RAM 3 by a known method, for example by calculating the check sum. If this checking shows the programme code to be correct, the CPU 1 is then controlled by the programme code in the RAM 3 and the radiotelephone is ready for use.

If an error is observed in this checking step, the control of the CPU 1 passes to the ROM 4, which transfers the CPU 1 into a waiting state. The waiting state can appropriately be indicated to the operator of the telephone via the radiotelephone's display. When this situation occurs, the operator connects a programming device, e.g. the service device located in a telephone retail outlet or the like, which contains the programme code of the respective radiotelephone in an appropriate storage means, to the external bus EXT BUS 5 of the radiotelephone. The service device can be of the type which also loads the initial telephone data, such as the call number etc.

This programme code version can for example be selected as the latest updating.

When the connection with the external device has been carried out and the current to the radiotelephone is switched on, the CPU 1 awaits reception of a predetermined instruction from the external bus 5. A communication programme of the ROM 4 records the data derived from the programming device, i.e. the programme code, into the RAM 3 on the basis of this instruction. After storing the programme code in the RAM 3, the checking programme of the ROM calculates a new check sum for the programme code in the RAM. This check sum is recorded (in the RAM 4 or another memory in the radiotelephone, e.g. EEPROM). After this the radiotelephone is ready for use again.

A new programme code can be loaded in RAM 3 even if the check sum is correct, since a programme is stored the ROM 4 for checking to see what, if anything, is connected to the external bus 5 each time the radiotelephone is switched on. If for instance it is found that a service device is connected to the external bus EXT BUS 5, the programme stored in the ROM 4 transfers the CPU 1 into a waiting state, after which the operation goes on as described above, the programme code selected from the service device being then recorded in the RAM 3.

The communication programme of the ROM 4 can of course be provided with handshaking routines familiar to a person skilled in the art, preventing an involuntary or mischievous change of the programme code of a functioning telephone.

The exhaustion of the security battery stops the operation of the radiotelephone. The operator then has to take the radiotelephone to be loaded by a service device. This corresponds to the present habit with radiotelephones, since the operator's short-dial register usually disappears as the battery is exhausted and has to be replaced by the service.

The ROM 4 may be an electronically-erasable PROM (EEPROM). The programmes stored in the ROM 4 may be recorded in an EPROM already existing in the radiotelephone for other reasons, provided that it has sufficient free capacity. Also these programmes of ROM 4 can of course be updated when needed, although such a need is not likely to occur. In this case, present replacing methods are used for updating the ROM.

The invention is advantageously implemented in mobile telephones and cellular telephones.

It will be evident, from the foregoing, to a person skilled in the art that modifications are possible within the scope of the present invention.

I claim:

1. A radiotelephone comprising:
   a volatile random access memory (RAM) for storing program code for the radiotelephone;
   a security battery connected to said volatile RAM for assuring continued temporary storage of said program code in the event of a loss of primary power;
   a nonvolatile read only memory (ROM) for containing code used to determine that a state of said program code is correct;
   an internal bus connected to said volatile RAM, nonvolatile ROM and connectable to an external bus emanating from a programming device; and
   processor means connected to said internal bus and operable upon primary power being applied to said radiotelephone, to be controlled by said code in said nonvolatile ROM to check that said state of said program code in said RAM is acceptable and, if an error is detected, to enter a wait state to await an interconnection of said external bus to said internal bus and a reloading of said program code via said external bus and internal bus from said programming device.

2. The radiotelephone as recited in claim 1, wherein said nonvolatile ROM further contains code that enables said processor means to control communications over said internal bus, whereby said program code may be read from said external bus and stored in said volatile RAM.

3. The radiotelephone as recited in claim 1, wherein said wait state is indicated to a user of said radiotelephone.

4. The radiotelephone as recited in claim 3 wherein said processor means checks the state of said program code in said RAM each time said primary power is applied.

5. The radiotelephone as recited in claim 4 wherein said processor means, under control of said code in said non-volatile ROM, enters said wait state if a said programming device is connected to said internal bus via said external bus.

* * * * *